(12) United States Patent
Yoshida et al.

(10) Patent No.: US 12,495,221 B2
(45) Date of Patent: Dec. 9, 2025

(54) LENS FLARE ELIMINATION METHOD, IMAGE CAPTURING APPARATUS, AND IMAGE MEASURING APPARATUS

(71) Applicant: MITUTOYO CORPORATION, Kanagawa (JP)

(72) Inventors: Hiroyuki Yoshida, Kanagawa (JP); Yuji Sadahira, Kanagawa (JP); Yuki Yamasaki, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 30 days.

(21) Appl. No.: 18/786,851

(22) Filed: Jul. 29, 2024

(65) Prior Publication Data

US 2025/0047992 A1 Feb. 6, 2025

(30) Foreign Application Priority Data

Aug. 1, 2023 (JP) ................................. 2023-125243

(51) Int. Cl.
*H04N 25/61* (2023.01)

(52) U.S. Cl.
CPC .................. *H04N 25/61* (2023.01)

(58) Field of Classification Search
CPC ...... H04N 25/61; G02B 21/365; G02B 21/06; G06T 5/77; G06T 2207/10056
See application file for complete search history.

(56) References Cited

U.S. PATENT DOCUMENTS

| | | | |
|---|---|---|---|
| 10,866,401 B2* | 12/2020 | Stoppe | G06T 5/50 |
| 2017/0070689 A1* | 3/2017 | Silverstein | H04N 25/671 |
| 2018/0284419 A1* | 10/2018 | Peschka | G02B 21/082 |
| 2022/0375045 A1* | 11/2022 | Wu | G06T 5/10 |

FOREIGN PATENT DOCUMENTS

JP 2015-225215 A 12/2015

* cited by examiner

*Primary Examiner* — Nhan T Tran
(74) *Attorney, Agent, or Firm* — Rankin, Hill & Clark LLP

(57) ABSTRACT

A method for eliminating lens flare that eliminates lens flare is provided. The lens flare elimination method performs: a step for acquiring images by irradiating the coaxial episcopic illumination light with varying irradiation intensities and capturing images at each irradiation intensity while the object is not placed on the mounting table; a step for capturing an image of the object by irradiating the object placed on the mounting table with the coaxial episcopic illumination light at an arbitrary irradiation intensity; a step for estimating an image for correction, which is the image at the irradiation intensity irradiated when the measurement object is captured, based on the images acquired in the image acquiring step; and a step for generating a post-correction image in which the lens flare is eliminated from the image of the object by obtaining the difference between the image of the object and the image for correction.

4 Claims, 5 Drawing Sheets

LENS FLARE ELIMINATION METHOD, IMAGE CAPTURING APPARATUS, AND IMAGE MEASURING APPARATUS

CROSS-REFERENCE TO RELATED APPLICATION

This non-provisional application claims priority under 35 U.S.C. § 119(a) from Japanese Patent Application No. 2023-125243, filed on Aug. 1, 2023, the entire contents of which are incorporated herein by reference.

BACKGROUND OF THE INVENTION

Field of the Invention

The present invention relates to a lens flare elimination method that contributes to elimination of lens flare that occurs in images captured while an object is illuminated by coaxial episcopic illumination, an image capturing apparatus, and an image measuring apparatus.

Description of the Related Art

Coaxial episcopic illumination is a form of illumination in which a half-mirror is used to align the optical axis of the light irradiating the object from above with the optical axis of the image capturing unit that receives the reflected light. With the coaxial episcopic illumination, the light is irradiated evenly onto the object, and only the normal reflected light from the object is received, thereby capturing an image in which the convex and concave of the surface of the object can be clearly identified. The coaxial episcopic illumination is applied, for example, to image measuring apparatus that measures the dimensions of each part of the object by performing edge detection through the brightness or darkness of the captured image (see, for example, JP 2015-225215A), or to microscopes that perform bright-field observation of the object.

SUMMARY OF THE INVENTION

Problems to be Solved by the Invention

When coaxial episcopic illumination light is irradiated onto the object through a lens, such as a telecentric lens, reflected light from the object will also reach the image capturing unit through the lens. If the intensity of the coaxial episcopic illumination light is high, part of the coaxial episcopic illumination light is reflected by the lens, and the reflected light here also reaches the image capturing unit and appears in the captured image as flare. Thus, in the case of image measurement, there were problems such as inaccurate measurement, and in the case of microscopy, there were problems such as deterioration in the quality of the observed image.

The object of the present invention is to provide a lens flare elimination method that contributes to eliminating lens flare that appears in an image captured by illuminating an object with coaxial episcopic illumination light through a lens and receiving the reflected light through the lens, an image capturing apparatus, and an image measuring apparatus.

Means for Solving the Problems

A lens flare elimination method according to the present invention eliminates lens flare in an image captured by irradiating a coaxial episcopic illumination light through a lens onto a mounting table on which an object is placed and receiving the reflected light through the lens. The lens flare elimination method performs: an image acquiring step for acquiring a plurality of images by irradiating the coaxial episcopic illumination light with varying irradiation intensities and capturing images at each irradiation intensity while the object is not placed on the mounting table; a measurement object imaging step, for capturing an image of the object by irradiating the object placed on the mounting table with the coaxial episcopic illumination light at an arbitrary irradiation intensity; a correction image generation step for estimating an image for correction, which is the image at the irradiation intensity irradiated in the measurement object imaging step, based on the plurality of images acquired in the image acquiring step; and a post-correction image generation step for generating a post-correction image in which the lens flare is eliminated from the image of the object by obtaining the difference between the image of the object and the image for correction.

The images for correction may be estimated by interpolation calculations based on a plurality of images acquired in the image acquiring step.

The image capturing apparatus of the present invention is one to which the lens flare elimination method of the present invention is applied. In the image capturing apparatus, a coaxial episcopic illumination light from an illumination unit is irradiated through a lens onto a mounting table on which an object is placed, and the reflected light is received by an image capturing unit through the lens to capture an image. The image capturing apparatus comprises: a memory unit that stores, in advance, a plurality of images captured by the image capturing unit at different irradiation intensities by the irradiating coaxial episcopic illumination light from the illumination unit while the object is not placed on the mounting table; and a control processing unit, which causes the illumination unit to irradiate the object placed on the mounting table with coaxial episcopic illumination light at an arbitrary irradiation intensity, causes the image capturing unit to capture an image of the object, estimates an image for correction, which is the image at the irradiation intensity of the coaxial episcopic illumination light when the image of the object is captured, based on the plurality of images stored in the memory unit, and generates a post-correction image in which the lens flare is eliminated from the image of the object by obtaining the difference between the image of the object and the image for correction.

The image measuring apparatus of the present invention is one to which the lens flare elimination method of the present invention is applied. The image measuring apparatus performs image measurement based on an image captured by irradiating coaxial episcopic illumination light from an illumination unit through a lens onto a mounting table on which a measurement object is placed, and having an image capturing unit receive the reflected light through the lens. The image measuring apparatus includes: a memory unit that stores, in advance, a plurality of images captured by the image capturing unit at different irradiation intensities by the irradiating coaxial episcopic illumination light from the illumination unit while the measurement object is not placed on the mounting table; and a control processing unit, which causes the illumination unit to irradiate the measurement object placed on the mounting table with coaxial episcopic illumination light at an arbitrary irradiation intensity, causes the image capturing unit to capture an image of the measurement object, estimates an image for correction, which is the image at the irradiation intensity of the coaxial episcopic illumination light when the image of the measurement object is captured, based on the plurality of images stored in the memory unit, generates a post-correction image in which the lens flare is eliminated from the image of the measurement object by obtaining the difference between the image of the measurement object and the image for correction, and performs image measurement on the post-correction image.

Effect of the Invention

According to the lens flare elimination method of the present invention, the lens flare in the image captured by irradiating the measurement object with the coaxial episcopic illumination light through the lens and receiving the reflected light through the lens can be eliminated. In addition, the image capturing apparatus can obtain an image of the measurement object with lens flare eliminated, and the imaging measuring apparatus can improve the accuracy of image measurement.

DETAILED DESCRIPTION OF THE EMBODIMENTS

Figure 1:
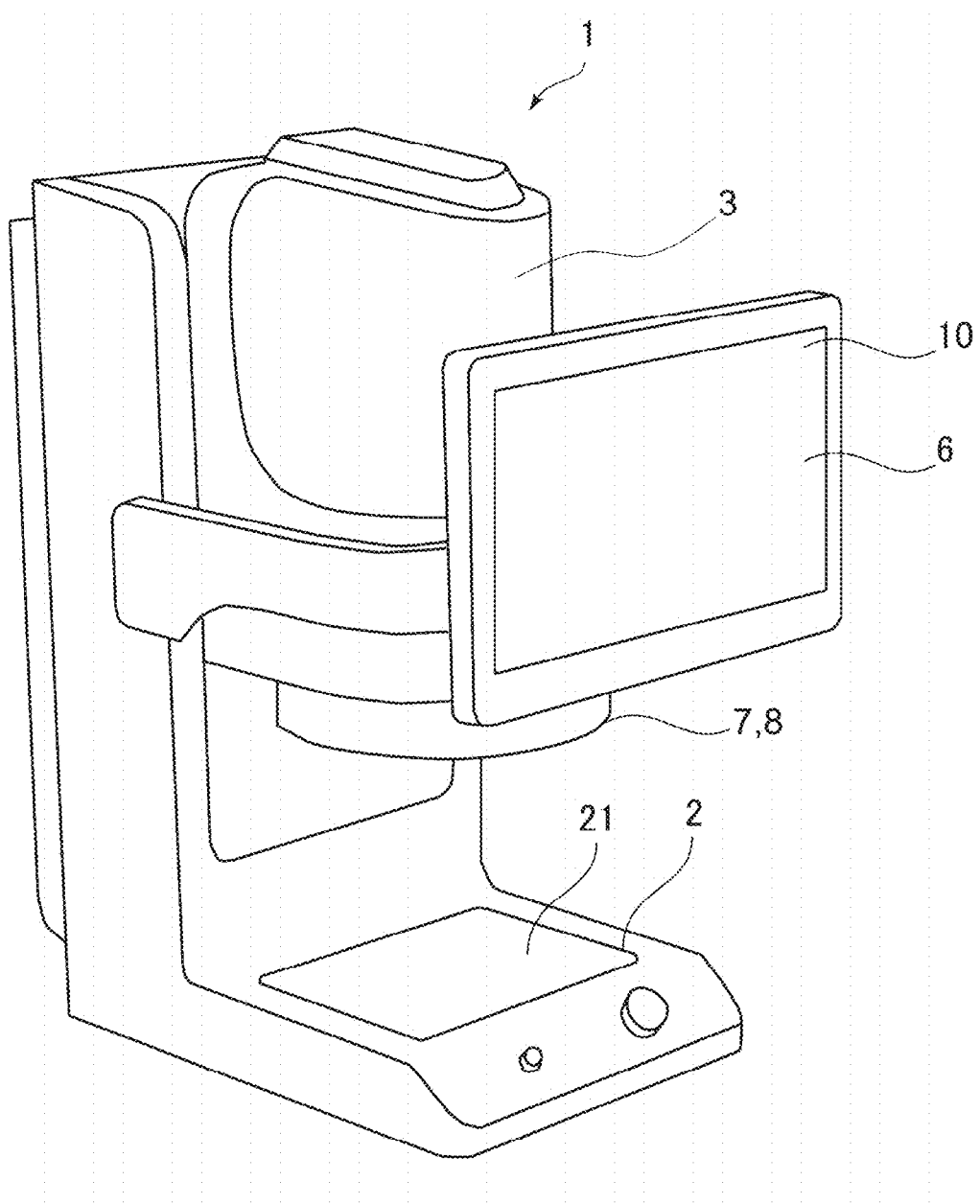
FIG. 1 shows an example of the appearance of an image measuring apparatus 1 to which the lens flare eliminating method is applied.

Hereinafter, embodiments of the present invention will be described with reference to the drawings. In the following description and drawings, the same reference numeral is attached to the same functional parts, and the functional parts, once explained, are either omitted or explained to the extent necessary.

The lens flare elimination method according to the present invention can be applied to any type of apparatus, such as image measuring apparatus and microscopes, as well as image capturing apparatus, as long as the coaxial episcopic illumination light for imaging the object is irradiated onto the object through the lens. In the following, an example of application to an image measuring apparatus will be explained.

Figure 2:
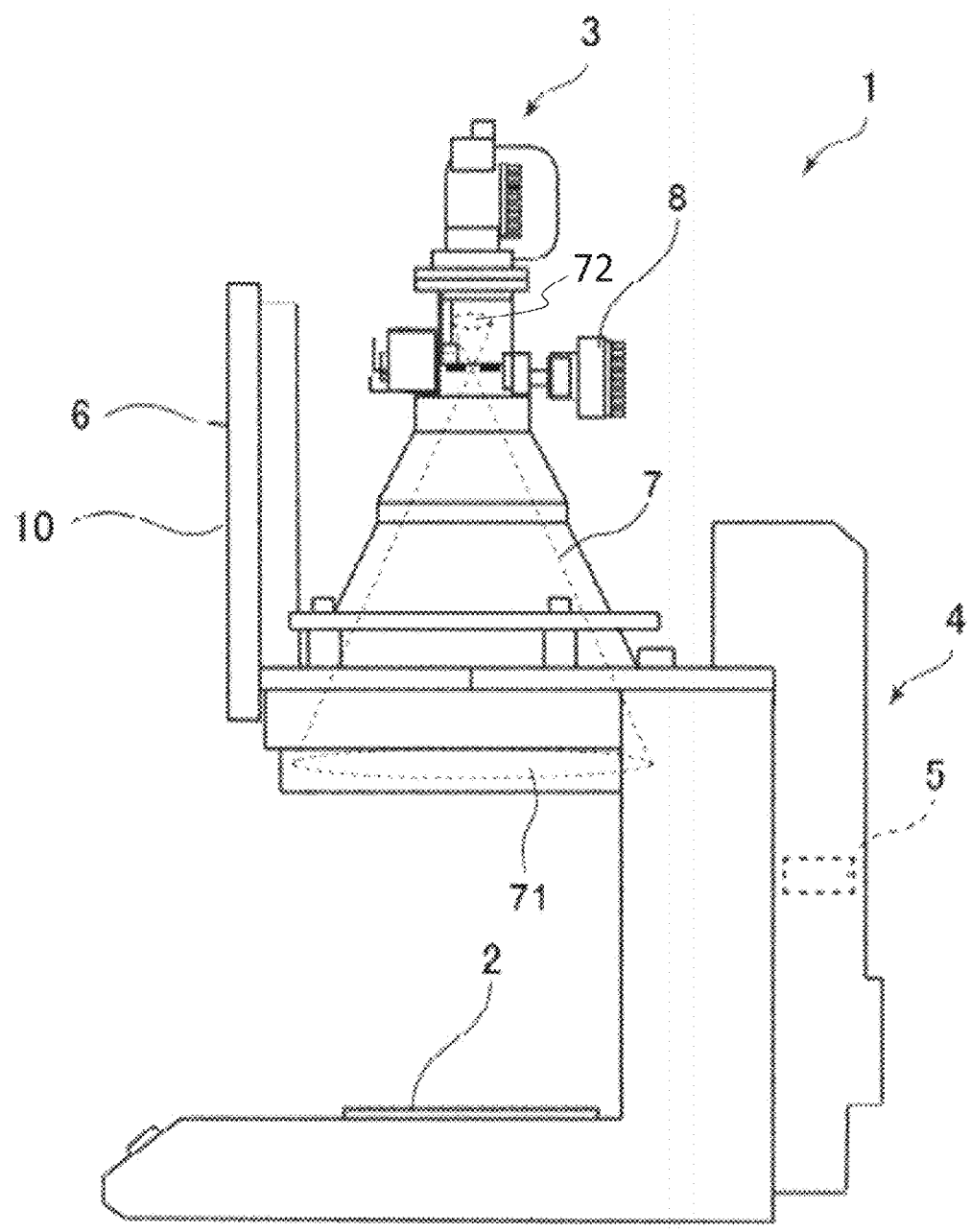
FIG. 2 shows a schematic diagram of the internal structure of the image measuring apparatus 1.
Figure 3:
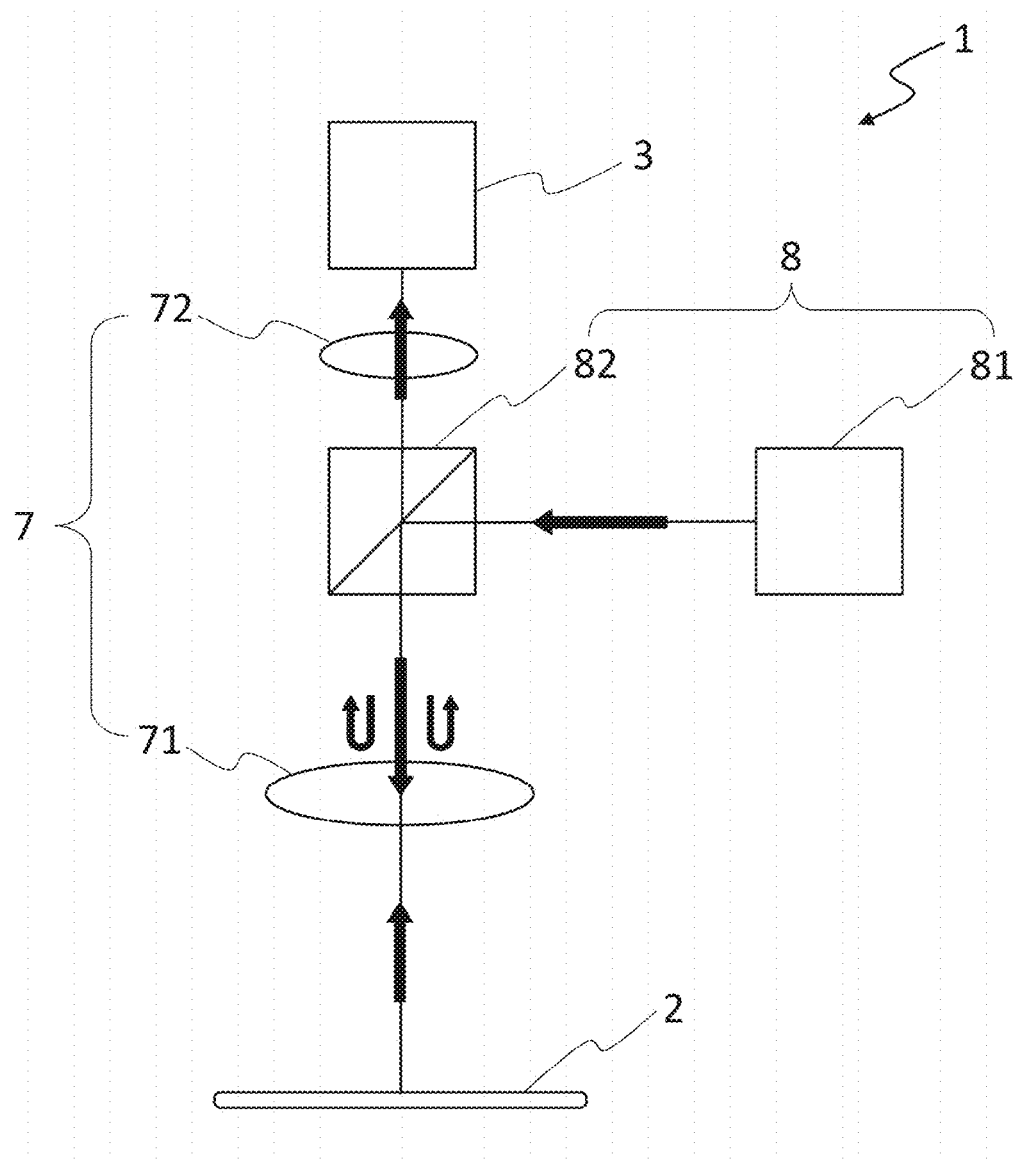
FIG. 3 is a schematic diagram showing an optical path in the image measuring apparatus 1.

FIG. 1 is a schematic diagram showing the appearance of the image measuring apparatus 1 to which the lens flare elimination method of the present invention is applied. FIG. 2 shows a schematic diagram of the internal structure of the image measuring apparatus 1. FIG. 3 is a schematic diagram showing an optical path in the image measuring apparatus 1.

The image measuring apparatus 1 includes a mounting table 2, an image capturing unit 3, control processing unit 4, a memory unit 5, display unit 6, a telecentric optical system 7, an illumination unit 8, and an operation unit 10.

The mounting table 2 is a platform on which a measurement object (not shown in the figure) is placed.

The image capturing unit 3 is disposed opposite the mounting table 2 and captures images by receiving light from the direction of the mounting table 2. The image capturing unit 3 includes an image sensor, which converts the brightness or darkness of an image formed on its light-receiving surface into an electrical signal, thereby generating image data. For the image sensor, semiconductor solid-state imaging devices such as CCD (Charge-Coupled Device) and CMOS (Complementary Metal Oxide Semiconductor) are used.

The control processing unit 4 controls each part in the image measuring apparatus 1 and performs necessary arithmetic processing to realize image capture and image measurement by the image measuring apparatus 1.

The telecentric optical system 7 includes an objective lens 71 that collects light from the direction of the mounting table 2 and an imaging lens 72 that forms an image of the light arriving through the objective lens 71 on the light-receiving surface of the image capturing unit 3. The objective lens 71 and the imaging lens 72 may have a plurality of lens surfaces, respectively.

The illumination unit 8 is a coaxial episcopic illumination means provided with a light source 81 that emits illumination light and a beam splitter 82 that interrupts the illumination light from the light source 81 into the telecentric optical system 7 and directs the light toward the mounting table 2 as coaxial episcopic illumination light whose optical axis coincides with that of the image capturing unit 3. The illumination unit 8 includes transillumination or side illumination as well as coaxial episcopic illumination for image clarity and other purposes.

As shown in FIG. 3, the coaxial episcopic illumination light from the light source 81 is irradiated toward the mounting table 2 through the objective lens 71, reflected by the mounting table 2 and the measurement object placed on the mounting table 2, and passes through the objective lens 71 again to reach the image capturing unit 3. When the coaxial episcopic illumination light enters the objective lens 71, a part of the light is reflected and reaches the image capturing unit 3 together with the reflected light from the mounting table 2, etc. The light reflected by the objective lens 71 causes unwanted flare in the image captured by the image capturing unit 3. The flare occurs more significantly as the number of lens surfaces that constitute the objective lens 71 is increased. If the flare appears in the image when the measurement object is imaged, the accuracy of the image measurement will be reduced.

Figure 4:
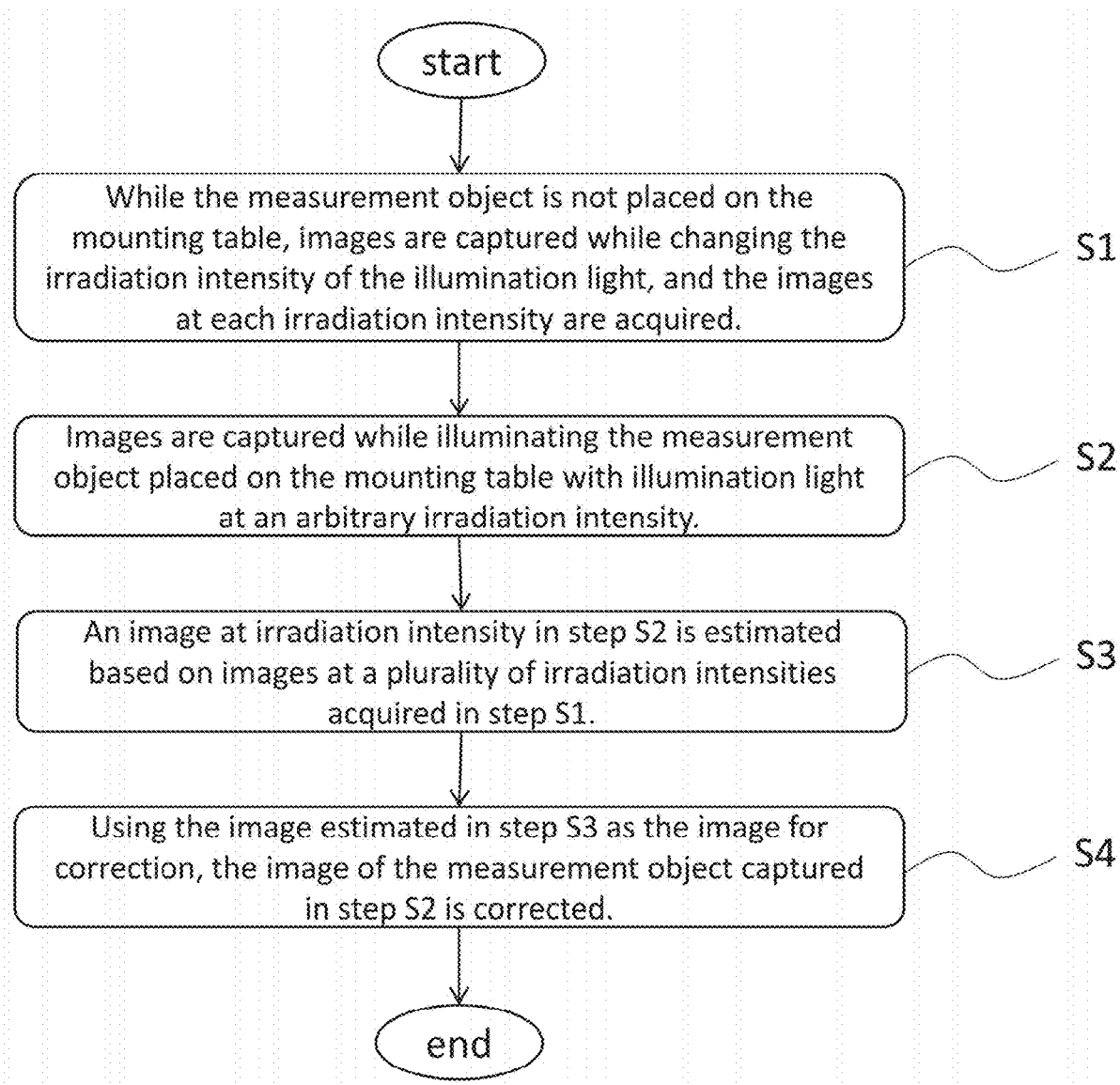
FIG. 4 is an execution flow diagram of the lens flare elimination method according to the present invention.

The image measuring apparatus 1 therefore eliminates lens flare that appears in the image of the measurement object by applying the lens flare elimination method shown in the flow diagram in FIG. 4.

First, a plurality of images are acquired by irradiating the coaxial episcopic illumination light with varying irradiation intensities and capturing images at each irradiation intensity while the measurement object is not placed on the mounting table 2 (image acquiring step S1). When imaging, light should be shielded by a blackout curtain or other means to prevent external light other than flare from being reflected in the image.

The flare occurs based on the presence of the objective lens 71, regardless of whether or not the measurement object is placed on the mounting table. Therefore, by performing imaging with no measurement object placed, a flare image, which is an image in which only the flare is captured, can be obtained. On the other hand, the degree of flare on the captured image depends on the intensity of the coaxial episcopic illumination light. Therefore, by acquiring flare images at a plurality of irradiation intensities, a flare image at an arbitrary irradiation intensity can be estimated, and this estimated flare image can be used as an image for correction at the arbitrary irradiation intensity.

Then, an image of the measurement object is captured by irradiating the measurement object placed on the mounting table 2 with the coaxial episcopic illumination light at an arbitrary irradiation intensity (a measurement object imaging step S2). The setting input of irradiation intensity may be made possible, for example, by configuring the display unit 6, which is a means of displaying information related to the measurement, as a touch panel display that also serves as the operation unit 10, which is a means of inputting information necessary for the measurement, and displaying the input interface on the display unit 6.

Based on the plurality of images acquired in the image acquiring step S1, an image for correction at the irradiation intensity of the coaxial episcopic illumination light in the measurement object imaging step S2 is estimated and generated (correction image generation step S3). The images for correction may be estimated, for example, by interpolation calculations based on a plurality of images acquired in the image acquiring step S1.

Note that the measurement object imaging step S2 and the correction image generation step S3 may be executed in parallel or in any order based on the setting input of the irradiation intensity.

Then, a post-correction image in which the lens flare is eliminated from the image of the measurement object by obtaining the difference between the image of the measurement object captured in the measurement object imaging step S2 and the image for correction (post-correction image generation step S4).

According to the lens flare elimination method of the present invention explained above, the lens flare in the image captured by irradiating the measurement object with coaxial episcopic illumination light through the lens and receiving the reflected light through the lens can be eliminated.

Figure 5:
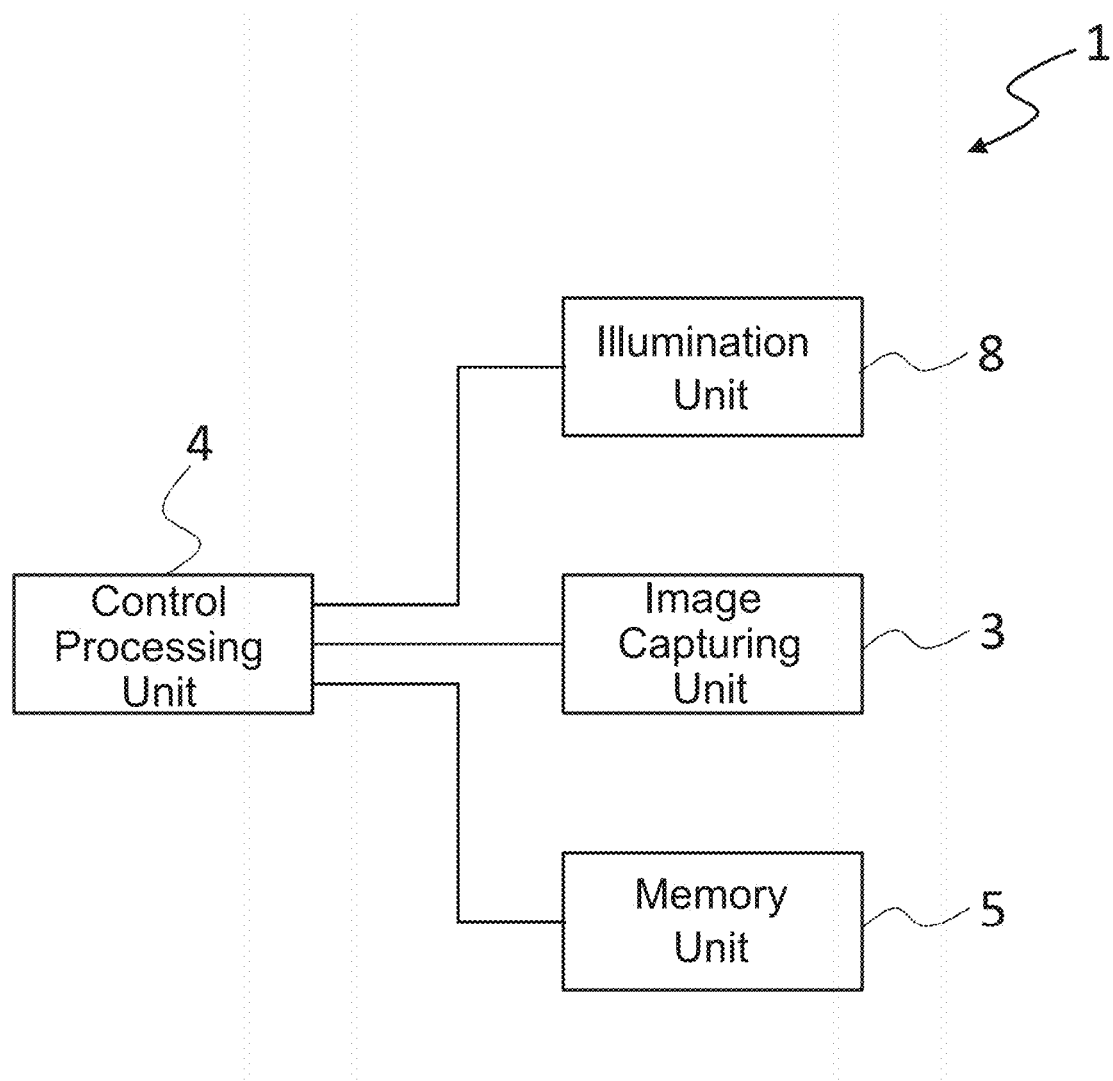
FIG. 5 is a functional block diagram of the image measuring apparatus 1 to which the lens flare elimination method of the present invention is applied.

The lens flare elimination method of the present invention can be realized in the image measuring apparatus 1 by, for example, providing a memory unit 5 that stores a plurality of images taken under the irradiation of coaxial episcopic illumination light of a plurality of irradiation intensities with no measurement object placed on the mounting table, which are acquired in the image acquiring step S1 executed in advance, and a control processing unit 4 that executes subsequent steps. FIG. 5 is a functional block diagram of the image measuring apparatus 1.

That is, the control processing unit 4 first causes the illumination unit 8 to irradiate coaxial episcopic illumination light of arbitrary intensity and the image capturing unit 3 to capture images of the measurement object placed on the mounting table (measurement object imaging step S2). At the same time, an image for correction is generated based on a plurality of images in the memory unit 5 at the irradiation intensity of the coaxial episcopic illumination light by the illumination unit 8 (correction image generation step S3). Then, a post-correction image is generated by obtaining the difference between the image of the measurement object and the image for correction (post-correction image generation step S4).

The functions of the control processing unit 4 may be realized by executing a program describing the processing of each step by the CPU. The program may be read from memory unit 5 or from another storage medium. The CPU and storage means, such as memory unit 5, may be provided in the main body of the image measuring apparatus 1, or in a computer or other device that is communicatively connected to the main body of the image measuring apparatus 1.

After the post-correction image is generated, the control processing unit 4 of the image measuring apparatus 1 performs image measurement on the post-correction image. The content of the image measurement is arbitrary. The results of the image measurement may be displayed on the display unit 6 or output using any other output means.

According to the image measuring apparatus 1, to which the lens flare elimination method of the present invention described above is applied, the accuracy of image measurement can be improved because image measurement can be performed on an image of the measurement object from which the lens flare has been eliminated.

By excluding the function of image measurement from the configuration of the image measuring apparatus 1, an image capturing apparatus that can obtain an image of the measurement object from which the lens flare has been eliminated may be configured.

In addition, for example, by applying the lens flare elimination method of the present invention to a microscope with coaxial episcopic illumination, the quality of the observed image can be improved.

The present invention is not limited to the above embodiments and variations. The above-mentioned embodiments and variations are examples only, and anything having a configuration substantially the same as the technical idea described in the claims of the present invention and producing similar effects is included in the technical scope of the present invention. In other words, changes can be made as appropriate within the scope of the technical ideas expressed in the present invention, and forms with such changes and improvements are also included in the technical scope of the present invention.

What is claimed is:

1. A lens flare elimination method that eliminates lens flare in an image captured by irradiating a coaxial episcopic illumination light through a lens onto a mounting table on which an object is placed and receiving the reflected light through the lens, wherein the lens flare elimination method performs:
   an image acquiring step for acquiring a plurality of images by irradiating the coaxial episcopic illumination light with varying irradiation intensities and capturing images at each irradiation intensity while the object is not placed on the mounting table;
   a measurement object imaging step for capturing an image of the object by irradiating the object placed on the mounting table with the coaxial episcopic illumination light at an arbitrary irradiation intensity;
   a correction image generation step for estimating an image for correction, which is the image at the irradiation intensity irradiated in the measurement object imaging step, based on the plurality of images acquired in the image acquiring step; and
   a post-correction image generation step for generating a post-correction image in which the lens flare is eliminated from the image of the object by obtaining the difference between the image of the object and the image for correction.

2. The lens flare elimination method according to claim 1, wherein the image for correction is estimated by interpolation calculations based on a plurality of images acquired in the image acquiring step.

3. An image capturing apparatus that captures an image by irradiating a coaxial episcopic illumination light from an illumination unit through a lens onto a mounting table on which an object is placed and receiving the reflected light by an image capturing unit through the lens, comprising:
- a memory unit that stores, in advance, a plurality of images captured by the image capturing unit at different irradiation intensities by the irradiating coaxial episcopic illumination light from the illumination unit while the object is not placed on the mounting table; and
- a control processing unit, which causes the illumination unit to irradiate the object placed on the mounting table with coaxial episcopic illumination light at an arbitrary irradiation intensity, causes the image capturing unit to capture an image of the object, estimates an image for correction, which is the image at the irradiation intensity of the coaxial episcopic illumination light when the image of the object is captured, based on the memory unit images stored in the memory unit, generates a post-correction image in which the lens flare is eliminated from the image of the object by obtaining the difference between the image of the object and the image for correction, and performs image measurement on the post-correction image.

4. An image measuring apparatus that performs image measurement based on an image captured by irradiating coaxial episcopic illumination light from an illumination unit through a lens onto a mounting table on which a measurement object is placed, and having an image capturing unit receive the reflected light through the lens, comprising:
- a memory unit that stores, in advance, a plurality of images captured by the image capturing unit at different irradiation intensities by the irradiating coaxial episcopic illumination light from the illumination unit while the measurement object is not placed on the mounting table; and
- a control processing unit, which causes the illumination unit to irradiate the measurement object placed on the mounting table with coaxial episcopic illumination light at an arbitrary irradiation intensity, causes the image capturing unit to capture an image of the measurement object, estimates an image for correction, which is the image at the irradiation intensity of the coaxial episcopic illumination light when the image of the measurement object is captured, based on the memory unit images stored in the memory unit, generates a post-correction image in which the lens flare is eliminated from the image of the measurement object by obtaining the difference between the image of the measurement object and the image for correction, and performs image measurement on the post-correction image.

* * * * *